April 8, 1952 C. E. SLADE ET AL 2,591,972
ELECTRIC WELDING SUPPLY CIRCUIT
Filed Jan. 17, 1948
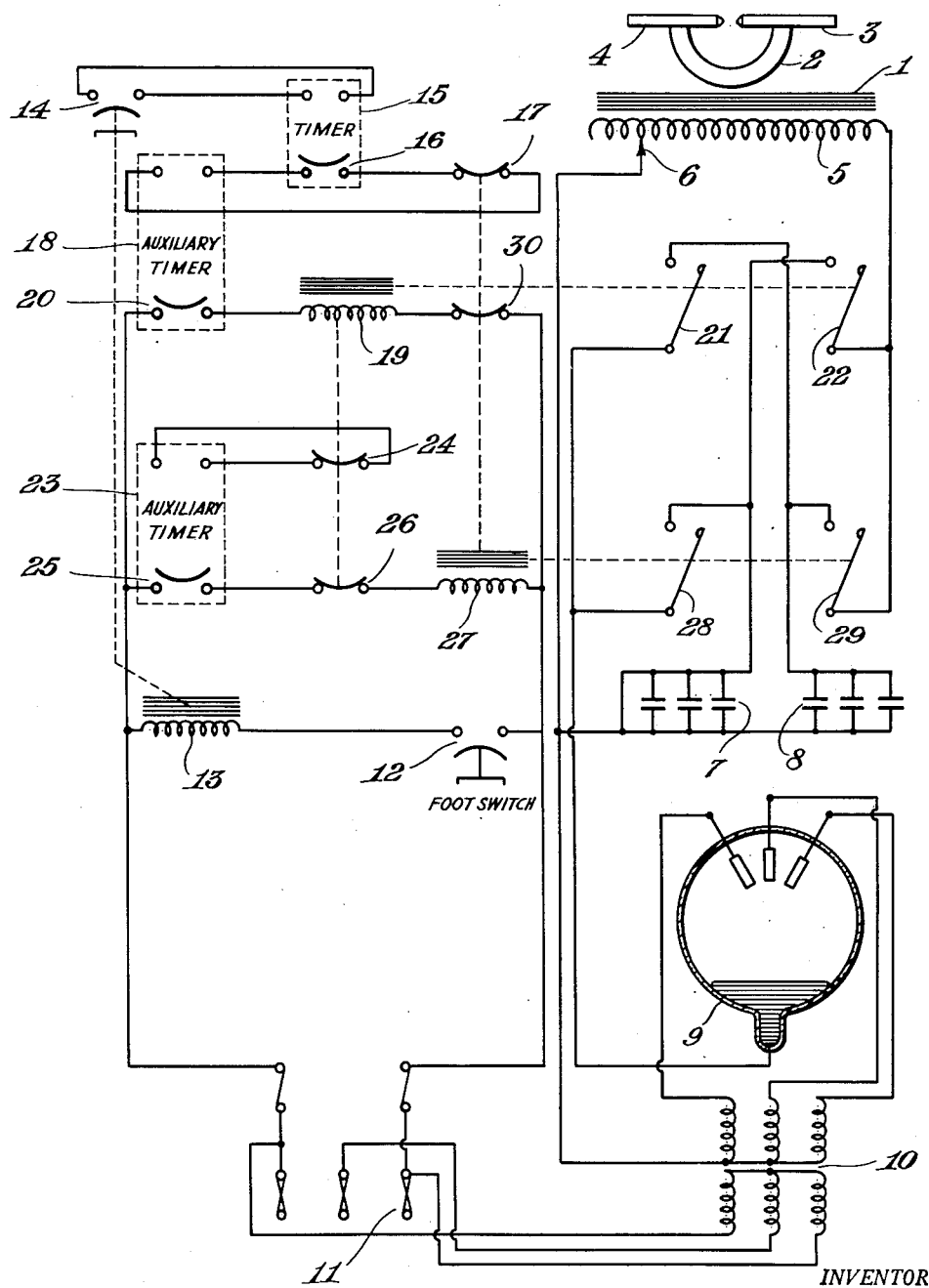
INVENTORS.
CHARLES EDWARD SLADE
ARTHUR KERSHAW
BY
Fred M Vogel
AGENT Patented Apr. 8, 1952

2,591,972

UNITED STATES PATENT OFFICE 2,591,972

ELECTRIC WELDING SUPPLY CIRCUIT

Charles E. Slade, Wembley, and Arthur Kershaw, London, England, assignors to The Hartford National Bank and Trust Company, Hartford, Conn., as trustee Application January 17, 1948, Serial No. 2,835
In Great Britain December 6, 1944

Section 1, Public Law 690, August 8, 1946
Patent expires December 6, 1964

2 Claims. (Cl. 219—4)

This invention relates to electric welding arrangements and has more particular reference to condenser welders in which a condenser or a bank of condensers charged from a convenient source, e. g. a metal-vapour rectifier supplied from A. C. mains, is discharged through the primary winding of the welding transformer to produce the welding current in the secondary winding. Such condenser welders are especially suitable for spot welding operations in which the interval between successive welds is adequate to enable the condenser or bank of condensers to be re-charged to the desired potential.

In the condenser welding arrangement according to the present invention a number of condensers or banks of condensers is provided, which condensers or banks of condensers are adapted to be discharged singly through the welding transformer circuit, at least one of the remaining condensers or banks of condensers being charged during the time the condenser or bank of condensers being discharged is connected to the welding transformer circuit. This arrangement opens up various possibilities. By providing a number of identical condensers or banks of condensers and discharging them singly and consecutively, the rate at which welding operations can be performed is increased and the arrangement becomes suitable for use as a seam welder (the seam being constituted by a series of closely adjacent spot welds) for welding light metals and light metal alloys for example. Alternatively, the usual welding condenser or bank of condensers may be associated with one or more auxiliary condensers or banks of condensers the discharge of which is employed to pre-heat and/or post-heat the weld in spot welding operations.

If a single charging source is employed, the contactors for connecting the condensers or banks of condensers to the source and to the welding transformer may be controlled by a cam shaft, so that at any moment not more than one of the condensers or banks of condensers is connected to the welding transformer whereas the others are connected to the charging source with the possible exception of the condenser or bank of condensers which is next to be connected to the welding transformer and which may be fully charged and disconnected from the charging source, i. e. isolated.

If two or more charging sources are employed, one may always be associated with the condenser or bank of condensers which is next to be discharged, whereas the other charging source (or sources) is (or are) connected with the remainder of those condensers or banks of condensers which are being charged.

In some circumstances it may be advantageous to provide a reservoir condenser or bank of condensers which is constantly connected with the charging source and which consequently shares its charge with the last-discharged condenser or bank of condensers when the latter is connected with the charging source.

To prevent unduly large surges between condensers or banks of condensers or between charging source and any condenser or bank of condensers, chokes may be included in the circuit at appropriate points, these chokes being so designed as not to affect materially the rate of charging.

In order that the invention may be more readily understood, reference will now be had to the accompanying diagrammatic drawing showing an electric welding arrangement comprising two banks of condensers which are discharged in succession through the primary winding of the welding transformer.

The welding transformer 1 has a secondary winding 2 supplying the welding current to the welding electrodes 3, 4. The primary winding 5 is provided with the usual tap switch 6 to enable the secondary voltage to be adjusted with a given primary voltage. Two banks of condensers 7, 8, each shown as consisting of three condensers in parallel, are arranged to be alternately charged from a mercury arc rectifier 9 supplied with current from the three-phase mains 11 by way of a three-phase transformer 10, and discharged through the primary winding 5, one bank being charged while the other is being discharged. This result is achieved by means of the switches 21, 22, 28, 29 in a manner which will be described more fully hereinafter.

The control arrangement as shown and now to be described is supplied with current from two phases of the supply. The operator-controlled switch 12, which normally is a foot switch, when closed by the operator energises the coil 13 actuating the air valve. This admits compressed air to the welding head to bring the welding electrodes 3, 4 into engagement with the work. When the air pressure reaches the requisite value, the air-operated switch 14 is caused to close, thereby completing the control circuit and initiating the operation of a master-timer 15, which in known manner times the duration of the weld to the nearest complete impulse of the subsidiary timers 18, 23. The master timer 15 closes a contact 16 in the control circuit of the subsidiary timer 18 which, provided an auxiliary contact 17 in series with the contact 16 is closed, operates to close for a pre-determined time a contact 20 in the circuit of a contactor coil 19. An auxiliary contact 30 in series with the coil 19 and the contact 20 is linked with the contact 17 and the two linked contacts are operated as hereinafter described. When the coil 19 is energised it closes the switches 21, 22 whereby the condenser bank 8 is connected to the rectifier 9 for charging, whereas any charge on the condenser bank 7 is discharged through the primary winding 5 of the welding transformer. The energisation of the coil 19 also opens two normally closed auxiliary contacts 24, 26, thereby ensuring that the second subsidiary timer 23 and the second contactor coil 27 cannot operate while the first contactor 19 is operative.

As soon as the subsidiary timer 18 reopens the contact 20, the coil 19 is de-energised, the switches 21, 22 open and the auxiliary contacts 24, 26 close. The closing of the contacts 24 initiates the operation of the second subsidiary timer 23 which closes the contact 25 in the circuit of the contactor 27. As the auxiliary contact 26 in series with the contactor coil 27 has already closed due to the de-energisation of the coil 19, the coil 27 is energised and closes the switches 28, 29 whereby the condenser bank 7 previously discharged is connected to the rectifier 9 for charging whereas the previously charged condenser bank 8 is discharged through the primary winding 5 of the welding transformer 1. The energisation of the coil 27 opens the auxiliary contacts 17, 30 so that operation of the first subsidiary timer 18 and the first contactor 19 is impossible while the second contactor 27 is operative.

As soon as the subsidiary timer 23 reopens the contact (25), the contactor coil 27 is de-energised, the switches 28, 29 open and the contacts 17, 30 close. Then, provided the master timer 15 has not cut out, the cycle of operation starts again with the initiation of the actuation of the first subsidiary timer 18, and this continues until the master timer 15 interrupts the control circuit of the timer 18. An alternative arrangement is to eliminate the master timer 15 and to control the contact 16 directly from the foot switch, i. e. to incorporate the air-operated switch 14 directly in the control circuit of the timer 18.

The arrangement as described above with reference to the drawing is capable of many modifications and the usual provision of bleed resistances can be made to prevent the condensers being left standing with a charge in them when the welding machine is not in use, as well as series chokes in the direct-current circuit of the rectifier to prevent an excessive initial rate of charging of completely discharged condensers. Also, if electrolytic condensers are used, provision may be made in known manner to avoid any reverse surge which would be detrimental to the condensers.

In the circuit arrangement as described and shown, both condenser banks 7, 8 discharge through the primary winding 5 in the same direction. It is readily possible to modify the contactor switching arrangements in such manner that the second condenser bank discharges through the transformer primary winding in the reverse direction to the first condenser bank.

We claim:

1. An electric welding system for producing a welding voltage comprising a welding transformer having a primary winding and a secondary winding for providing the welding voltage, first and second capacitive elements, a direct voltage source for charging said elements, a first switching member arranged upon actuation to connect simultaneously said first element across said source and said second element across said primary winding, a second switching member arranged upon actuation to connect simultaneously said first element across said primary winding and said second element across said source, first and second electromagnetic relays, first and second normally closed switches respectively connected in series with said first and second relays, said first relay being arranged upon energization to actuate said first switching member and to open said second switch, said second relay being arranged upon energization to actuate said second switching member and to open said first switch, whereby only one of said members may be actuated at any one time, and means to energize successively said first and second relays.

2. An electric welding system for producing a welding voltage comprising a welding transformer having a primary winding and a secondary winding for providing the welding voltage, first and second capacitive elements, a voltage source for charging said elements, a first switching member arranged upon actuation to connect simultaneously said first element across said source and said second element across said primary winding, a second switching member arranged upon actuation to connect simultaneously said first element across said primary winding and said second element across said source, first and second electromagnetic relays, first and second normally closed switches connected respectively in series with said first and second relays, said first relay being arranged upon energization to actuate said first switching member and to open said second switch, said second relay being arranged upon energization to actuate said second switching member and to open said first switch, whereby only one of said members may be actuated at any one time, a master timer, a first auxiliary timer, and a second auxiliary timer, said master timer being arranged to actuate said first auxiliary timer for a predetermined period, said first auxiliary timer being arranged to apply an energizing current to said first relay for a predetermined period to actuate said first member, said first relay being further arranged to actuate said second auxiliary timer, said second auxiliary timer being arranged to apply energizing current to said second relay for a predetermined period to actuate said second member.

C. SLADE.
ARTHUR KERSHAW.

REFERENCES CITED

The following references are of record in the file of this patent:

FOREIGN PATENTS

| Number | Country | Date |
|--------|---------|------|
| 249,735 | Germany | July 29, 1912 |
| 859,306 | France | June 3, 1940 |